United States Patent [19]

Lutz

[11] 4,443,418

[45] Apr. 17, 1984

[54] METHOD OF REMOVING HYDROGEN SULFIDE AND CARBON DIOXIDE FROM GASES

[75] Inventor: Eugene F. Lutz, Houston, Tex.

[73] Assignee: Shell Oil Company, Houston, Tex.

[21] Appl. No.: 441,830

[22] Filed: Nov. 15, 1982

Related U.S. Application Data

[63] Continuation of Ser. No. 337,232, Jan. 6, 1982, abandoned.

[51] Int. Cl.³ ............................................. B01D 53/34
[52] U.S. Cl. .................................. 423/226; 423/224;
423/573 G; 562/572
[58] Field of Search ............... 423/224, 226, 228, 229,
423/573 G, 573 R; 562/572

[56] References Cited

U.S. PATENT DOCUMENTS

| | | | |
|---|---|---|---|
| 3,068,065 | 12/1962 | Hartley et al. | 423/228 |
| 3,226,320 | 12/1965 | Meuly et al. | 423/224 X |
| 3,933,993 | 1/1976 | Salemme | 423/226 X |
| 4,009,251 | 2/1977 | Meuly | 423/573 G |
| 4,091,073 | 5/1978 | Winkler | 423/573 G X |

*Primary Examiner*—Earl C. Thomas
*Attorney, Agent, or Firm*—Albert J. Adamcik

[57] ABSTRACT

A process for the recovery of nitrilotriacetic acid values from solutions containing polyvalent metal complexes of nitrilotriacetic and the decomposition products thereof is described, the process being characterized by the addition to such solutions of sufficient strong acid to dissociate the complex under conditions to precipitate the nitrilotriacetic acid.

14 Claims, No Drawings

METHOD OF REMOVING HYDROGEN SULFIDE AND CARBON DIOXIDE FROM GASES

This is a continuation of application Ser. No. 337,232, filed Jan. 6, 1982, and now abandoned.

BACKGROUND OF THE INVENTION

The presence of significant quantities of $H_2S$ and $CO_2$ in various "sour" industrial gaseous streams poses a persistent problem. Although various procedures have been developed to remove and recover these contaminants, most such processes are deficient, for a variety of reasons.

In one cyclic method currently attracting attention, the sour gas is contacted, preferably with a solvent-reactant system which comprises a regenerable reactant, to provide solid free sulfur which is recovered either prior or subsequent to regeneration. Suitable reactant materials include polyvalent metallic ions, such as iron, vanadium, copper, manganese, and nickel, and include polyvalent metal chelates. Preferred reactants are coordination complexes in which the polyvalent metals form chelates with specified organic acids.

In yet another process, e.g., that disclosed in U.S. Pat. No. 4,091,073, issued May 23, 1978, to Winkler, $CO_2$ present in the gaseous stream is also removed by the use of a suitable selective absorbent.

Other processes, such as that described in U.S. Pat. No. 3,226,320 to Meuly, involve removal of impurities from aqueous streams utilizing various polyvalent metal chelates.

Because these "cleanup" processes generally represent significant costs to manufacturing operations, any improvements in such processes which increase their efficiency may have great economic importance. For example, where ligands or chelates or polyvalent metals are employed, degradation or decomposition of the polyvalent metal chelates represents an important cost in the process, as well as requiring measures for decomposition product bleed or removal and addition of fresh solution. Even in the case of preferred chelates such as those of N-(2-hydroxyethyl) ethylene diamine triacetic acid and nitrilotriacetic acid, ligand decomposition, over a period of time, requires attention to prevent build-up of decomposition products and consequent loss of efficiency. As will be recognized, the bleed from such processes contains, along with the decomposition products, a considerable amount of the valuable chelate or chelates. A procedure for recovery of the chelate(s) or derivatives or precursors thereof could have great economic importance. The invention is such a process.

SUMMARY OF THE INVENTION

Accordingly, the invention relates to a process in which an aqueous solution or admixture containing a composition selected from polyvalent metal chelates of nitrolotriacetic acid, and mixtures thereof, and containing decomposition products of said composition, is contacted with a sufficient amount of a specified acid to dissociate at least the bulk of the polyvalent metal chelate or chelates in the admixture, and under conditions to precipitate a solid from the solution or admixture containing nitrolotriacetic acid. The precipitated solid is then separated from the solution or admixture. As used herein, the term "under conditions to precipitate a solid", and variants thereof, merely implies the use of temperatures at which the acid exceeds its solubility in the solution or admixture treated. Such conditions may be inherent in the steps performed, or may be accomplished simply by cooling.

The stream or aqueous admixture treated is preferably a bleed stream from one of the types of processes mentioned, supra. For example, the invention is admirably suited to recovering the chelate values in a bleed stream from a cyclic process for $H_2S$ removal from gas streams, even those of such processes utilizing a selective absorbent. The oxidizing polyvalent metal chelates of nitrilotriacetic acid, and mixtures thereof, may be used in the $H_2S$ removal embodiment of the invention. The chelates or iron, copper, vanadium and manganese are preferred, particularly iron.

Accordingly, in this context, the invention comprises, in this embodiment, a process for the removal of $H_2S$ from a sour gaseous stream including:

(a) contacting the sour gaseous stream in a contacting zone with an aqueous reaction solution at a temperature below the melting point of sulfur, the mixture comprising an effective amount of an oxidizing reactant selected from the group consisting of oxidizing polyvalent metal chelates of nitrilotriacetic acid, and mixtures thereof, to produce a sweet gas stream and an aqueous admixture containing sulfur and reduced reactant;

(b) removing aqueous admixture from the contacting zone, and removing solid sulfur from said aqueous admixture;

(c) regenerating said aqueous admixture, producing a regenerated oxidizing reactant solution, and returning regenerated oxidizing reactant solution to the contacting zone;

(d) removing a bleed stream containing a composition selected from polyvalent metal chelates of nitrilotriacetic acid, and mixtures thereof, and containing decomposition products of said composition, from one or more loci in steps a, b, or c;

(e) contacting said bleed stream with sufficient amount of a specified acid to dissociate at least the bulk of the polvalent chelate or chelates in the bleed stream under conditions to precipitate a solid from the bleed stream containing nitrilotriacetic acid, and precipitating said solid and separating precipitated solid from the bleed stream.

As will be evident to those skilled in the art, the particular location or point of removal of the bleed in such a process is not critical, although removal of the bleed "subsequent" to the contact zone and "prior" to return of regenerated solution to the contact zone in the cyclic process is preferred. Again, the bleed may be removed from a portion of the process stream if the stream is divided for any purpose, e.g., a portion for sulfur removal, and a portion sent directly to regeneration. The specifics of the $H_2S$ removal process are not critical; e.g., the sulfur and bleed may be removed prior to, or preferably, subsequent to regeneration. Moreover, the sulfur may first be concentrated in a portion of the liquid in circulation in the process, and this may be done prior to or subsequent to regeneration. If the sulfur-containing liquid is first concentrated into a slurry before final separation of the sulfur, the liquid, or a portion thereof, from the slurry may be utilized as a "bleed" stream. The bleed stream may be continuous or intermittent, although the overall $H_2S$ removal procedure is preferably continuous. Fresh make-up chelate or chelate-containing solution may similarly be applied continuously or intermittently. The rate and volume of bleed will depend on a variety factors, such as choice of and inherent rate of ligand decomposition, whether or not ligand stabilizers are employed, the volume of $H_2S$ removed (and thus the volume of water formed) all of which must be correlated to maintain balance in the system. Accordingly, a precise volume of bleed (and make-up) (although obviously a quite minor portion of the total volume of liquid in the system) cannot be given, but, in general, 20 percent to 0.5 percent, by volume, of the total liquid capacity in the process will suffice.

As indicated, the invention also encompasses treating sour gaseous streams which contain $H_2S$ and significant quantities of $CO_2$, in the manner described. More particularly, the sour gas stream containing $H_2S$ and $CO_2$ is contacted with a selective absorbent-aqueous reactant mixture at a temperature below the melting point of sulfur, the reactant mixture and procedure being similar to that described, supra. Broadly, this is accomplished by the use of an absorbent mixture containing a selective absorbent for $CO_2$ (and preferably for $H_2S$, as well), and an effective amount of an oxidizing polyvalent metal chelate of nitrilotriacetic acid, and mixtures thereof, as described supra. A purified or "sweet" gaseous stream is produced which meets general industrial and commercial $H_2S$ and $CO_2$ specifications. The $CO_2$ is absorbed and the $H_2S$ is immediately converted to sulfur by the polyvalent metal chelate, etc. In the process, the reactant is reduced, and the sulfur may be treated, as described, supra. The sulfur may be removed prior or subsequent to regeneration of the admixture. A bleed stream may suitably be removed, and treated, as described herein.

In any event, the solution or admixture containing the chelate or chelates is contacted with a specified acid. Suitable acids are selected from $H_2SO_4$, HCl, $H_3PO_4$ and mixtures thereof. The acid or acids are supplied in an amount sufficient to dissociate at least the bulk of the polyvalent metal complex or complexes of nitrilotriacetic acid in the solution or admixture and precipitate the solid acid. In general, sufficient acid should be supplied to lower the pH of the solution or admixture to a pH of about 1 to 3. This amount, of course, may be determined by experimentation. The precipitated acid may be separated by any suitable means such as by filtration, and the supernatant liquid may be recovered or sent to waste treatment. Although minor amounts of decomposition products of the chelates will also precipitate, the great bulk of the precipitate will comprise the desired nitrilotriacetic acid. The acid may suitably be treated with an alkali metal hydroxide or ammonium hydroxide, and may be recomplexed, as described, infra, with a polyvalent metal.

DETAILED DESCRIPTION OF THE INVENTION

The particular types of solutions or admixtures treated according to the invention do not appear critical. Since the acid values sought to be recovered appear stable at low pH, virtually any solution containing the specified polyvalent metal chelate or chelates of nitrilotriacetic acid and their decomposition products and from which it is sought to recover the acid may be employed. The polyvalent metal chelate or chelates may be present in more than one species; for example, the solution or admixture may contain both the $Fe+++$ and $Fe++$ chelates of nitrilotriacetic acid. As indicated, it is a surprising advantage of the invention that the bulk of the decomposition products does not precipitate, but remains in solution upon the strong acid addition, and thus, an effective separation is achieved.

While the invention, accordingly, has general utility, nonetheless, the great value of the invention lies in the ability to recover the nitrilotriacetic acid so that it may be returned to the aforementioned gas purification process. The polyvalent metal chelates of nitrilotriacetic acid are readily formed in aqueous solution by reaction of an appropriate salt, oxide, or hydroxide of the polyvalent metal and the chelating agent in the acid form or an alkali or ammonium salt of the chelating acid. In the present case, the acid, upon recovery from the supernatant liquor, is preferably neutralized with an alkali metal hydroxide or ammonium hydroxide.

In the case of utilization of a bleed stream from the aforementioned gas purification processes, the particular type of gaseous stream treated is not critical, as will be evident to those skilled in the art. Streams particularly suited to removal of $H_2S$ by the practice of the invention are, as indicated, naturally-occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especialy those streams of this type having a low ratio of $H_2S$ to $CO_2$, and other gaseous hydrocarbon streams. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the practice of the invention. The $H_2S$ content of the type of streams contemplated will vary extensively, but, in general, will range from about 0.1 percent to about 10 percent by volume. $CO_2$ content may also vary, but may range from about 0.5 percent to about 95 percent or greater by volume. Obviously, the amounts of $H_2S$ and $CO_2$ present are not generally a limiting factor in the practice of the invention.

The temperatures employed in the contacting or absorption-contact zone are not generally critical, except that the reaction is carried out below the melting point of sulfur, and, if an absorbent is used, the temperatures employed must permit aceptable absorption of $CO_2$. In many commercial applications, such as the removal of $H_2S$ and $CO_2$ from natural gas to meet pipeline specifications, absorption at ambient temperatures is desired, since the cost of refrigeration would exceed the benefits obtained due to increased absorption at the lower temperature. In general, temperatures from 10° C. to 80° C. are suitable, and temperatures from 20° C. to 45° C. are preferred. Contact times will range from about 1 second to about 120 seconds, with contact times of 2 seconds to 60 seconds being preferred.

Similarly, in the regeneration or stripping zone or zones, temperatures may be varied widely. Preferably, the regeneration zone should be maintained at substantially the same temperature as the contacting zone. If heat is added to assist regeneration, cooling of the aqueous admixture is required before return of the admixture to the contacting zone. If heat is added to assist regeneration, cooling of the aqueous admixture is required before return of the admixture to the contacting zone. In general, temperatures of from about 10° C. to 80° C., preferably 20° C. to 40° C., may be employed.

Pressure conditions in the contacting or absorption zone may vary widely, depending on the pressure of the gas to be treated. For example, pressures in the contact zone may vary from one atmosphere up to one hundred fifty or even two hundred atmospheres. Pressures of from one atmosphere to about one hundred atmospheres are preferred. In the regeneration or desorption zone or zones, pressures may also be varied considerably, and will preferably range from about 0.5 atmosphere to about three of four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, dated Dec. 11, 1962, and U.S. Pat. No. 4,009,251, to Meuly, issued Feb. 22, 1977, which disclosures are incorporated herein by reference. Preferably, if the iron chelate of nitrilotriacetic acid is used, pH in the process of the invention will range from about 6 to about 7.5, and the molar ratio of the nitrilotriacetic acid to the iron is from about 1.2 to 1.6. The procedure is preferably conducted continuously.

As indicated, the invention provides, in the $H_2S$ removal embodiments, for the regeneration of the reactant and the absorbent. Preferably, the loaded absorbent mixture and the reduced polyvalent metal chelate, or mixtures thereof, are regenerated by contacting the mixture in a regeneration zone or zones with oxygen. As used herein, the term "oxygen" includes oxygen-containing gases such as air, or air-enriched with oxygen. If significant quantities of $CO_2$ have been absorbed, the reactant-containing solution is preferably treated, such as by heating or pressure reduction, to remove the bulk of the $CO_2$ before regeneration of the reactant (either prior or subsequent to sulfur removal). Alternately, or if small quantities of $CO_2$ are absorbed, the $CO_2$ may simply be stripped in the regeneration zone.

As noted, the regeneration of the reactant is preferably accomplished by the utilization of oxygen, preferably as air. The oxygen will accomplish two functions, the oxidation of the reactant to its higher valence state, and the stripping of any residual $CO_2$ (if originally present) from the absorbent mixture. The oxygen (in whatever form supplied) is supplied in a stoichiometric equivalent or excess with respect to the amount of reduced metal ion of the chelate or chelates present in the mixture. Preferably, the oxygen is supplied in an amount from about 1.2 to 3 times excess.

The $H_2S$, when contacted, is quickly converted by the polyvalent metal chelate, or chelates of the nitrilotriacetic acid to elemental sulfur. The amount of polyvalent chelate, or mixtures thereof, supplied is an effective amount, i.e., an amount sufficient to convert all or substantially all of the $H_2S$ in the gas stream, and will generally be on the order of at least about one mol per mol of $H_2S$. Ratios of from about 1 or 2 mol to about 15 mols of polyvalent metal chelate per mol of $H_2S$ may be used, with ratios of from about 2 mols per mol to about 5 mols of polyvalent metal chelate per mol of $H_2S$ being preferred. The manner of preparing the aqueous solution or admixture is a matter of choice. The polyvalent metal chelate solution will generally be supplied as an aqueous solution having a concentration of from about 0.1 molar to about 2 molar, and a concentration of about 0.5 molar is preferred.

Since the polyvalent metal chelates or nitrilotriacetic acid have limited solubility in many solvents or absorbents, if an absorbent is used, the polyvalent metal chelates are preferably supplied in admixture with the liquid absorbent and water. The manner of preparing the admixture containing an absorbent is a matter of choice. For example, the chelate may be added to the absorbent, and, if necessary, then water added. The amount of water added will normally be just that amount necessary to achieve solution of the polyvalent metal chelate, and can be determined by routine experimentation. Since the polyvalent metal chelate or chelates may have a significant solubility in the solvent, and since water is produced by the reaction of the $H_2S$ and the ions of the chelate or chelates, precise amounts of water to be added cannot be given. In the case of absorbents having a low solubility for the polyvalent metal chelate or chelates, approximately 5 percent to 10 percent water by volume, based on the total volume of the absorbent mixture, will generally provide solvency. Preferably, however, the polyvalent metal chelate or chelates are added as an aqueous solution to the liquid absorbent. Where the reactant is supplied as an aqueous solution, the amount of solution supplied may be about 20 percent to about 80 percent by volume of the total absorbent admixture supplied to the absorption zone. A polyvalent metal chelate solution will generally be supplied as an aqueous solution having a concentration of from about 0.1 molar to about 2 molar, and a concentration of about 0.5 molar is preferred.

If an absorbent is employed, it is selected from those absorbents which have a high degree of selectivity in absorbing $CO_2$ (and preferably $H_2S$ as well) from the gaseous streams. Any of the known absorbents conventionally used (or mixtures thereof) which do not affect the activity of the polyvalent chelate, or mixtures thereof, and which exhibit sufficient solubility for the reactant or reactants may be employed. As indicated, the absorbent preferably has good absorbency for $H_2S$ as well, in order to assist in the removal of any $H_2S$ present in the gaseous streams. The particular absorbent chosen is a matter of choice, given these qualification, and selection can be made by routine experimentation. For example, diethylene glycol ethyl mono-ether, propylene carbonate, tetraethylene glycol-dimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2 may be used. Suitable temperature and pressure relationships for different $CO_2$-selective absorbents are known, or can be calculated by those skilled in the art.

As noted, if a bleed stream solution is the stream contemplated, the "bleed" is preferably treated after sulfur removal (whether before or after regeneration). The manner of recovery of the sulfur is a matter of choice. For example, the sulfur may be recovered by settling, filtration, or by suitable devices such as a hydroclone. Moreover, it may be advantageous to concentrate the sulfur first in a portion of the admixture, either before or after regeneration. For example, the sulfur-containing admixture from the contacting zone (or from the regeneration zone) may be separated into two portions, a portion or stream having reduced sulfur content, and a portion or stream containing increased sulfur content, preferably a slurry. The manner of separation is a matter of choice, and equipment such as a hydroclone or a centrifugal separator may be employed. If a slurry is produced, the "slurry" or concentrated stream will comprise 2 percent to 30 percent, by volume, (on a continuous basis) of the total stream from the contact or regeneration zone. It is not necessary that absolutely all sulfur be removed on a continuous basis in the process; the process may suitably be operated with a very minor inventory or significantly reduced content of sulfur in the system.

In the case where a slurry is produced, the slurry may be filtered or subjected to further treatment to remove the sulfur, and the recovered admixture may be used as all or portion of the bleed treated for acid recovery, or it may be returned to the process cycle, either before or after regeneration.

In order to demonstrate the feasibility of the invention, the following experiment was run.

Approximately 30 ml. of solution from a cyclic process (700 cycles) for the reaction of $H_2S$ to sulfur was obtained after sulfur removal. The solution contained about 0.8 percent iron as $Fe^{+++}$, about 0.09 percent iron as $Fe^{++}$, about 1.3 percent thiosulfate ion, and had the following organic ligand composition, as determined by gas chromatographic analysis of the corresponding n-butyl esters:

| | |
|---|---|
| Nitrilotriacetic acid | 41.9 |
| Iminodiacetic acid | 33.4 |
| N—Oxalyl Iminodiacetic acid | 0.9 |
| N—Oxalyl Glycine | 3.4 |
| Glyoxalic acid | 6.2 |
| Glycine | 3.3 |
| Oxalic acid | 5.1 |
| Misc. | 5.8 |
| | 100.0 |

The solution was then combined or contacted with 1.7 ml. of 96 percent $H_2SO_4$, and a precipitate occurred which was recovered by filtration. After drying, the precipitate was weighed, analyzed as noted above, and found to contain 97 percent of the nitrilotriacetic acid in the initial solution. The composition of the precipitate is shown in Table 1.

TABLE 1

| | |
|---|---|
| Nitrilotriacetic acid | 81.5 |
| Iminodiacectic acid | 12.1 |
| N—Oxalyl Iminodiacetic acid | 0.2 |
| N—Oxalyl Glycine | 0.5 |
| Glyloxalic acid | 1.2 |
| Glycine | 0.4 |
| Oxalic acid | 2.1 |
| Misc. | 2.0 |
| | 100.0 |

EXPERIMENT 2

Approximately 30 ml. of solution from a cyclic process (430 cycles) for the reaction of $H_2S$ to sulfur was obtained after sulfur removal. The solution contained about 0.8 percent iron as $Fe^{+++}$, 0.09 percent iron as $Fe^{++}$, about 1.3 percent thiosulfate ion, and had the following organic ligand composition, as determined by gas chromatic analysis of the corresponding n-butyl esters:

| | |
|---|---|
| Nitrilotriacetic acid | 44.6 |
| Iminodiacetic acid | 31.2 |

-continued

| | |
|---|---|
| N—Oxalyl Iminodiacetic acid | 0.55 |
| N—Oxalyl Glycine | 2.4 |
| Glyoxalic acid | 11.7 |
| Glycine | 2.2 |
| Oxalic acid | 5.2 |
| Misc. | 2.15 |
| | 100.0 |

The solution was then combined or contacted with 1.64 ml. of 96 percent $H_2SO_4$, and cooled to precipitate a solid which was recovered by filtration. After drying, the precipitate was weighed, analyzed as noted above, and found to contain 94% of the nitrilotriacetic acid in the initial solution. The composition of the precipitate is shown in Table 2, where analysis of the nitrilotriacetic acid, iminodiacetic acid, and oxalic acid contents was obtained by high performance liquid chromatography (HPLC). The other components were determined to be quite small by gas chromatography.

TABLE 2

| | |
|---|---|
| Nitrilotriacetic acid | 93.7 |
| Iminodiacetic acid | 5.9 |
| N—Oxalyl Iminodiacetic acid | |
| N—Oxalyl Glycine | |
| Glyoxalic acid | |
| Glycine | |
| Oxalic acid | 0.4 |
| Misc. | |
| | 100.0 |

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, a contacting column might comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, sodium formate, sodium thiosulfate and sodium acetate, which may be beneficial.

What is claimed is:

1. A process comprising contacting an aqueous solution containing a composition selected from polyvalent metal chelates of nitrilotriacetic acid, and mixtures thereof, and containing decomposition products of said composition, with sufficient acid selected from the group consisting of HCl, $H_2SO_4$, $H_3PO_4$, and mixtures thereof, to dissociate at least the bulk of the polyvalent metal chelate or chelates in the solution and under conditions to precipitate from the solution a solid containing nitrilotriacetic acid, and precipitating said solid and separating said solid from the solution.

2. The process of claim 1 wherein the aqueous solution is a bleed stream from a process for removing $H_2S$ from sour gaseous streams in which the $H_2S$-containing gaseous stream is contacted with an oxidizing reactant solution containing an effective amount of an oxidizing reactant selected from the group consisting of oxidizing polyvalent metal chelates of nitrilotriacetic acid, and mixtures thereof.

3. The process of claim 1 wherein the composition is selected from the ferric chelate of nitrilotriacetic acid, the ferrous chelate of nitrilotriacetic acid, and mixtures thereof.

4. The process of claim 2 wherein the oxidizing reactant is the ferric chelate of nitrilotriacetic acid, and the composition is selected from the ferric chelate of nitrilotriacetic acid, the ferrous chelate of nitrilotriacetic acid, and mixtures thereof.

5. A process for the removal of $H_2S$ from a sour gaseous stream comprising:
   (a) contacting the sour gaseous stream in a contacting zone with an aqueous reaction solution at a temperature below the melting point of sulfur, the solution comprising an effective amount of an oxidizing reactant selected from the group consisting of oxidizing polyvalent metal chelates of nitrilotriacetic acid, and mixtures thereof, to produce a sweet gas stream and an aqueous admixture containing sulfur and reduced reactant;
   (b) removing aqueous admixture from the contacting zone, and removing solid sulfur from said aqueous admixture;
   (c) regenerating said aqueous admixture, producing a regenerated oxidizing reactant solution, and returning regenerated oxidizing reactant solution to the contacting zone;
   (d) removing a bleed stream containing a composition selected from polyvalent metal chelates of nitrilotriacetic acid, and mixtures thereof, and containing decomposition products of said composition, from one or more loci in steps a, b, or c;
   (e) contacting said bleed stream with sufficient acid selected from the group consisting of HCl, $H_2SO_4$, $H_3PO_4$, and mixtures thereof, to dissociate at least the bulk of the polyvalent chelate or chelates in the bleed stream under conditions to precipitate a solid from the bleed stream containing nitrilotriacetic acid, and precipitating said solid and separating precipitated solid from the bleed stream.

6. The method of claim 5 wherein the oxidizing reactant is the ferric chelate of nitrilotriacetic acid, the reduced reactant is the ferrous chelate of nitrilotriacetic acid; and the composition of step (d) is selected from the ferric chelate of nitrilotriacetic acid, the ferrous chelate of nitrilotriacetic acid, and mixtures thereof.

7. A process for the removal of $H_2S$ from a sour gaseous stream comprising:
   (a) contacting the sour gaseous stream in a contacting zone with an aqueous reaction solution at a temperature below the melting point of sulfur, the solution comprising an effective amount of an oxidizing reactant selected from the group consisting of oxidizing polyvalent metal chelates of nitrilotriacetic acid, and mixtures thereof, to produce a sweet gas stream and an aqueous admixture containing sulfur and reduced reactant;
   (b) removing aqueous admixture from the contacting zone;
   (c) regenerating aqueous admixture from step (b), producing a regenerated oxidizing reactant solution, and removing solid sulfur from the regenerated oxidizing reactant solution;
   (d) returning regenerated oxidizing reactant solution to the contacting zone;
   (e) removing a bleed stream containing a composition selected from polyvalent metal chelates of nitrilotriacetic acid, and mixtures thereof, and containing decomposition products of said composition, from one or more loci in steps a, b, c, or d;
   (f) contacting said bleed stream with sufficient acid selected from the group consisting of HCl, $H_2SO_4$, $H_3PO_4$, and mixtures thereof, to dissociate at least the bulk of the polyvalent chelate or chelates in the bleed stream under conditions to precipitate a solid from the bleed stream containing nitrilotriacetic acid, and precipitating said solid, and separating precipitated solid from the bleed stream.

8. The method of claim 7 wherein the oxidizing reactant is the ferric chelate of nitrilotriacetic acid, the reduced reactant is the ferrous chelate of nitrilotriacetic acid; and the composition of step (d) is selected from the ferric chelate of nitrilotriacetic acid, the ferrous chelate of nitrilotriacetic acid, and mixtures thereof.

9. A process for the removal of $H_2S$ and $CO_2$ from a sour gaseous stream comprising:
   (a) contacting the sour gaseous stream containing $H_2S$ and $CO_2$ in a contacting zone with a selective absorbent-aqueous reactant mixture at a temperature below the melting point of sulfur, said mixture comprising an effective amount of an oxidizing reactant selected from the group consisting of oxidizing polyvalent metal chelates of nitrilotriacetic acid, and mixtures thereof, to produce a sweet gas stream and an aqueous admixture containing sulfur, absorbed $CO_2$, and reduced reactant;
   (b) removing aqueous admixture from the contacting zone, and removing solid sulfur from said aqueous admixture;
   (c) removing $CO_2$ from and regenerating said aqueous admixture, producing $CO_2$ and a regenerated selective absorbent-aqueous reactant solution, and returning said regenerated solution to the contacting zone;
   (d) removing a bleed stream containing a composition selected from polyvalent metal chelates of nitrilotriacetic acid, and mixtures thereof, and containing decomposition products of said composition, from one or more loci in steps a, b or c;
   (e) contacting said bleed stream with sufficient acid selected from the group consisting of HCl, $H_2SO_4$, $H_3PO_4$, and mixtures thereof, to dissociate at least the bulk of the polyvalent chelate or chelates in the bleed stream under conditions to precipitate a solid from the bleed stream containing nitrilotriacetic acid, and precipitating said solid and separating precipitated solid from the bleed stream.

10. The method of claim 9 wherein the oxidizing reactant is the ferric chelate of nitrilotriacetic acid, the reduced reactant is the ferrous chelate of nitrilotriacetic acid; and the composition of step (d) is selected from the ferric chelate of nitrilotriacetic acid, the ferrous chelate of nirilotriacetic acid, and mixtures thereof.

11. A process for the removal of $H_2S$ and $CO_2$ from a sour gaseous stream comprising:
   (a) contacting the sour gaseous stream containing $H_2S$ and $CO_2$ in a contacting zone with a selective absorbent-aqueous reactant mixture at a temperature below the melting point of sulfur, said mixture comprising an effective amount of an oxidizing reactant selected from the group consisting of oxidizing polyvalent metal chelates of nitrilotriacetic acid, and mixtures thereof, to produce a sweet gas stream and an aqueous admixture containing sulfur, absorbed $CO_2$, and reduced reactant;

(b) removing aqueous admixture from the contacting zone, and removing $CO_2$ from said aqueous admixture;

(c) removing solid sulfur from and regenerating said aqueous admixture, producing a regenerated selective absorbent-aqueous reactant solution, and returning said regenerated solution to the contacting zone;

(d) removing a bleed stream containing a composition selected from polyvalent metal chelates of nitrilotriacetic acid, and mixtures thereof, and containing decomposition products of said composition, from one or more loci in steps a, b or c;

(e) contacting said bleed stream with sufficient acid selected from the group consisting of HCl, $H_2SO_4$, $H_3PO_4$, mixtures thereof, to dissociate at least the bulk of the polyvalent chelate or chelates in the bleed stream under conditions to precipitate a solid from the bleed stream containing nitrilotriacetic acid, and precipitating said solid and separating precipitated solid from the bleed stream.

12. The method of claim 11 wherein the oxidizing reactant is the ferric chelate of nitrilotriacetic acid, the reduced reactant is the ferrous chelate of nitrilotriacetic acid; and the composition of step (d) is selected from the ferric chelate of nitrilotriacetic acid, the ferrous chelate or nitrilotriacetic acid, and mixtures thereof.

13. A process for the removal of $H_2S$ and $CO_2$ from a sour gaseous stream comprising:

(a) contacting the sour gaseous stream containing $H_2S$ and $CO_2$ in a contacting zone with a selective absorbent-aqueous reactant mixture at a temperature below the melting point of sulfur, said mixture comprising an effective amount of an oxidizing reactant selected from the group consisting of oxidizing polyvalent metal chelates of nitrilotriacetic acid, and mixtures thereof, to produce a sweet gas stream and an aqueous admixture containing sulfur, absorbed $CO_2$, and reduced reactant;

(b) removing aqueous admixture from the contacting zone;

(c) regenerating said aqueous admixture from step (b) and removing $CO_2$, producing $CO_2$ and a regenerated selective absorbent-aqueous reactant mixture containing sulfur;

(d) removing solid sulfur from said regenerated mixture; and returning regenerated selective absorbent-aqueous reactant mixture to the contacting zone;

(e) removing a bleed stream containing a composition selected from polyvalent metal chelates of nitrilotriacetic acid, and mixtures thereof, and containing decomposition products of said composition, from one or more loci in steps a, b, c, or d;

(f) contacting said bleed stream with sufficient acid selected from the group consisting of HCl, $H_2SO_4$, $H_3PO_4$, and mixtures thereof, to dissociate at least the bulk of the polyvalent chelate or chelates in the bleed stream under conditions to precipitate a solid from the bleed stream containing nitrilotriacetic acid, and precipitating said solid and separating precipitated solid from the bleed stream.

14. The method of claim 13 wherein the oxidizing reactant is the ferric chelate of nitrilotriacetic acid, the reduced reactant is the ferrous chelate of nitrilotriacetic acid; and the composition of step (e) is selected from the ferric chelate of nitrilotriacetic acid, the ferrous chelate of nitrilotriacetic acid, and mixtures thereof.

* * * * *